United States Patent [19]
Higuchi

[11] Patent Number: 6,002,602
[45] Date of Patent: Dec. 14, 1999

[54] SWITCHING POWER SOURCE WITH POWER OUTAGE DETECTION SIGNAL

[75] Inventor: Yoshio Higuchi, Osaka, Japan

[73] Assignee: Funai Electric Co., Ltd., Osaka, Japan

[21] Appl. No.: 08/924,658

[22] Filed: Sep. 5, 1997

[30] Foreign Application Priority Data

Sep. 6, 1996 [JP] Japan .................................. 8-236684

[51] Int. Cl.⁶ .................................................. H02M 3/335
[52] U.S. Cl. ................................................ 363/95; 363/97
[58] Field of Search ................................ 363/15, 16, 95, 363/97

[56] References Cited

U.S. PATENT DOCUMENTS

| | | | |
|---|---|---|---|
| 5,079,600 | 1/1992 | Kido | 363/125 |
| 5,140,511 | 8/1992 | Lee et al. | 363/97 |
| 5,297,014 | 3/1994 | Saito et al. | 363/97 |
| 5,313,381 | 5/1994 | Balakrishnan | 363/97 |
| 5,572,413 | 11/1996 | Hirahara | 363/97 |
| 5,675,485 | 10/1997 | Seong | 363/97 |
| 5,703,765 | 12/1997 | Preis | 363/97 |
| 5,726,869 | 3/1998 | Yamashita et al. | 363/97 |
| 5,742,494 | 4/1998 | Brakus et al. | 363/97 |
| 5,748,461 | 5/1998 | Preller | 363/97 |
| 5,757,631 | 5/1998 | Semmler | 363/97 |

*Primary Examiner*—Jeffrey Sterrett
*Attorney, Agent, or Firm*—Morgan, Lewis & Bockius LLP

[57] ABSTRACT

In a switching power source, an error signal indicating an error of an output voltage is applied to an insolation element whose input and output are insolated from each other, and an output of the insolation element is utilized to control a switching operation, thereby to stabilize the output voltage. The switching power source includes a power outage detecting section in which, when an input voltage of a switching circuit adapted to switch a current flowing in a primary coil becomes lower than a predetermined value, the level of the error signal is a limit level, and when the level of the error signal becomes the limit level, a power outage detection signal is produced.

13 Claims, 3 Drawing Sheets

SWITCHING POWER SOURCE WITH POWER OUTAGE DETECTION SIGNAL

BACKGROUND OF THE INVENTION

1. Field of the Invention

This invention relates to a switching power source in which the error of an output voltage is fed back to the primary side through an insolation element, and more particularly, to a switching power source in which a power outage detection signal is produced according to a signal indicating the error of the output voltage.

2. Description of the Related Art

In general, a power outage detecting circuit in an industrial control device, comprises: a photo-coupler for detecting both waves of a commercial power source; and a timer (such as a mono-stable multi-vibrator) which is triggered by the output of the photo-coupler and can be triggered again.

That is, the timer is triggered by every wave (of both waves) of the commercial power source. Hence, the timer is reset before the time counting period is ended so that the time counting operation is performed again from the beginning. As a result, normally, the timer output is maintained at the level indicating a time counting state (a level indicating a non-power-outage state).

On the other hand, when power outage occurs, the timer is not triggered. Therefore, when the time counting period passes which is set, for instance, to two cycles of the commercial power source, the time counting operation is ended, and the output level is inverted; that is, the output level is changed into the level which indicates the occurrence of power outage.

The above-described circuit is able to detect the power outage before the output voltage of the switching power source is decreased; that is, it is able to detect the occurrence of power outage considerably quickly. However, the circuit arrangement is complex because it needs an insolation element, namely, a photo-coupler, and a timer which can be triggered again.

In order to prevent the circuit arrangement from becoming complex, a switching power source used in a device for consumers is so designed that the output voltage of the secondary side is utilized for detection of the occurrence of power outage. FIG. 4 shows a conventional detecting circuit which utilizes the output voltage of the secondary side to detect the occurrence of power outage (the primary side circuit, and an error detecting circuit are not shown).

As shown in FIG. 4, the base of a transistor Q11, which is provided for the detection of the occurrence of power outage, is connected through a Zener diode ZD (hereinafter referred to merely as "a diode ZD", when applicable) to a negative output 31. The Zener voltage of the diode ZD is so determined that the sum of the base-emitter voltage of the transistor Q11 and the Zener voltage of the diode ZD is lower about several volts than the difference voltage between the output 32 (which is 5 V) and the negative output 31. Hence, during the non-power-outage period, a base current flows in the transistor Q11, and a power outage detection signal 33 is at "H" level.

On the other hand, upon occurrence of power outage, the voltages of the negative output 31 and the output 32 are decreased. When the difference voltage between the output 32 and the negative output 31 becomes smaller than the sum of the base-emitter voltage of the transistor Q11 and the Zener voltage of the diode ZD, the transistor Q11 is turned off, so that the level of the power outage detection signal 33 is changed to "L" level indicating the occurrence of power outage.

In the above-described conventional detecting circuit, a smoothing capacitor C11 for the negative output 31 is small in capacitance, and therefore when power outage occurs, the voltage of the negative output 31 is quickly decreased. Accordingly, the current flowing in the diode ZD becomes zero quickly, and the transistor Q11 is turned off.

FIG. 5 is a graphical representation indicating changes in voltage of the output 32 with changes in level of the power outage detection signal 33 in the above-described conventional detecting circuit.

That is, the capacitor C11 being small in capacitance, the voltage of the negative output 31 is quickly decreased, and therefore at the time instant T12 when the voltage of the output 32 is not so decreased, the power outage detection signal 33 is set to "L" level. However, at the time instant T12, the voltage of the output 32 starts to decrease. Therefore, after the time instant T12, the period of time is extremely short for which the voltage of the output 32 maintains the power source voltage of the microcomputer at the specified value. Hence, the time margin for the microcomputer to treat the power outage is short.

In order to increase the time margin, the rate of decrease of the voltage of the output 32 should be decreased. For this purpose, smoothing capacitors C12 and C13 for the output 32 should be increased in capacitance. However, if the smoothing capacitors C12 and C13 are increased in capacitance, they are increased in price, and the resultant detecting circuit is increased in size as much.

On the other hand, there is a method in which the capacitor C11 is decreased in capacitance thereby to shorten a period of time t11. However, since the capacitor C11 is used for smoothing the voltage of the negative output 31, and therefore its capacitance is limited in minimum value. This makes it impossible to shorten the period of time t11 so much.

SUMMARY OF THE INVENTION

Accordingly, an object of the invention is to eliminate the above-described difficulties accompanying a conventional switching power source.

Another object of the invention is to provide a switching power source in which the occurrence of power outage is detected from the level of an error signal indicating an error of the output signal, whereby, even when a power outage detection is carried out on the secondary side, the power outage detection can be achieved quickly.

In order to achieve the above objects, the invention provides a switching power source in which an error signal indicating an error of an output voltage is applied to an insolation element whose input and output are insolated from each other, and an output signal of the insolation element is utilized to control a switching operation, thereby to stabilize the output voltage, the switching power source comprising: a power outage detecting section in which, when an input voltage of a switching circuit adapted to switch a current flowing in a primary coil becomes lower than a predetermined voltage, the level of the error signal is a limit level, and when the level of the error signal becomes the limit level, a power outage detection signal is produced.

BRIEF DESCRIPTION OF THE DRAWINGS

In the accompanying drawings:

FIG. 3 is a graphical representation indicating changes in voltage of the main line in the switching power source when the power switch is turned on;

DETAILED DESCRIPTION OF THE PREFERRED EMBODIMENT

A switching power source, which constitutes an embodiment of the invention, will be described with reference to the accompanying drawings.

Figure 1:
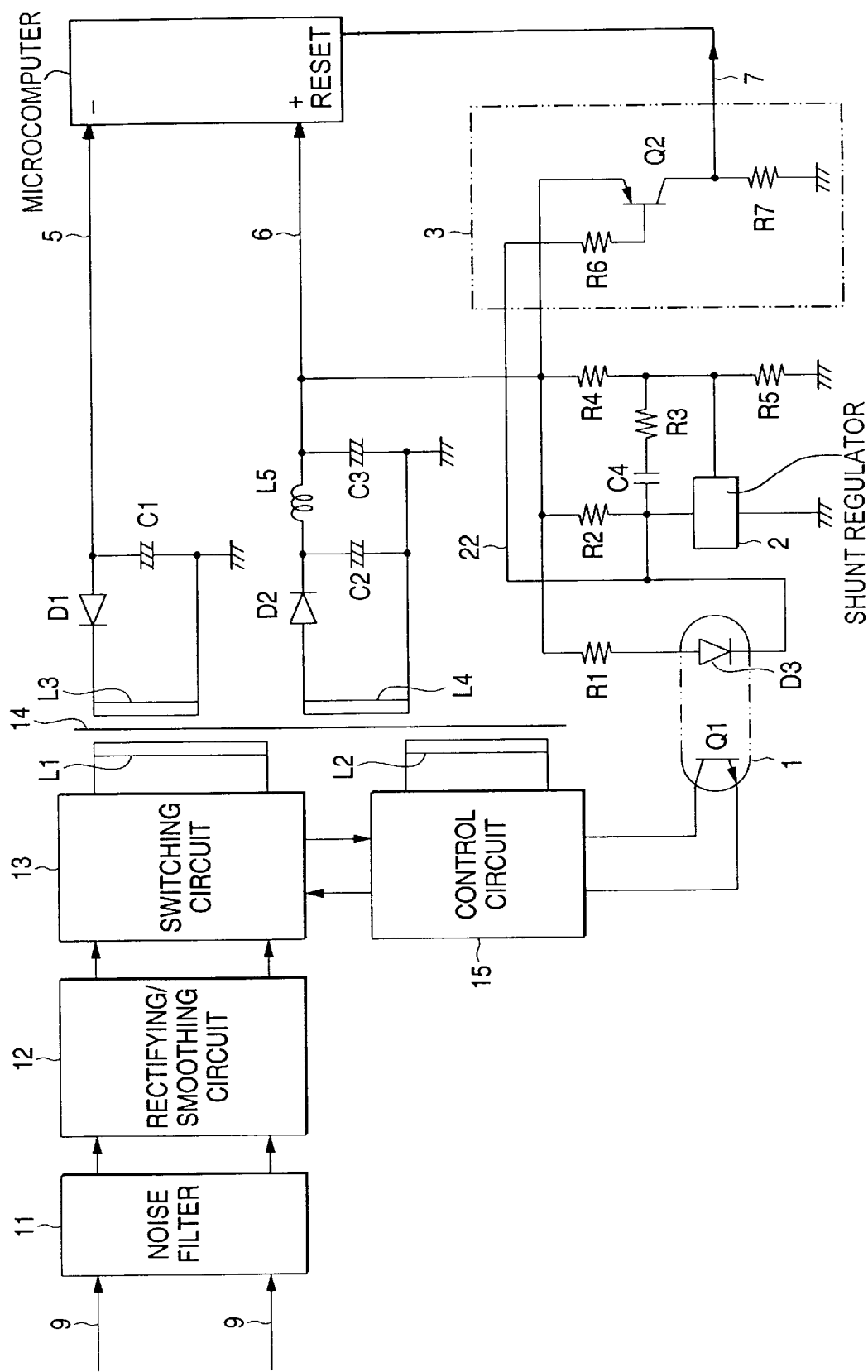
FIG. 1 is a circuit diagram, partly as a block diagram, showing the arrangement of a switching power source, which constitutes an embodiment of the invention.

In FIG. 1, reference numeral 11 designates a noise filter to which a commercial power source 9 of, for instance, 100 V is connected. The noise filter 11 is a line filter which prevents a switching noise from leaking to the side of the commercial power source 9, the switching noise being produced by the switching operation of a switching circuit 13 and transmitted through a rectifying/smoothing circuit 12.

The rectifying/smoothing circuit 12 is a circuit unit comprising a diode bridge, and a smoothing capacitor having a large capacitance. The circuit 12 is adapted to rectify and smooth the commercial power 9 applied thereto through the noise filter 11, thereby to provide a DC output, which is applied to the switching circuit 13.

The switching circuit 13 is a circuit unit which comprises: a switching transistor connected between the output of the rectifying/smoothing circuit 12 and a primary coil L1 of a transformer 14; and a snubber circuit which absorbs the counter-electromotive force induced in the primary coil L1 when the switching transistor is turned off. The switching circuit 13 switches the current of the primary coil L1 with the period of the output of a control circuit 15.

The control circuit 15 is a circuit unit which controls the switching operation of the switching circuit 13 according to the output current of a photo-coupler 1, thereby to maintain the voltages of outputs 5 and 6 at predetermined voltages respectively. For this purpose, the control circuit 15 comprises: a control transistor which controls the base current of the switching transistor in the switching circuit 13 according to the output current of the photo-coupler 1; and a protective circuit which limits the emitter current of the switching transistor to a predetermined value, to prevent the switching transistor from being damaged when the power switch is turned on. The control circuit 15 operates on the voltage produced by an auxiliary coil L2.

A shunt regulator 2 is a circuit unit which detects a voltage error of the output 6 to output a detection signal, namely, an error signal. More specifically, the shunt regulator 2 changes the current value of the output so that a voltage provided by the voltage-division of resistors R4 and R5 is 2.5 V.

The photo-coupler 1 is an insolation element in which the input and the output are insolation from each other. The photo-coupler 1 includes a light emitting diode D3, and a photo-transistor Q1. The output (error signal) of the shunt regulator 2 flows to the light emitting diode D3. The photo-transistor Q1 outputs the current which corresponds to the error signal inputted thereto, so that the error of the voltage of the output 6 is fed back to the primary side.

More specifically, the cathode of the light emitting diode D3 is connected to the output of the shunt regulator 2, and the anode of the light emitting diode D3 is connected to one terminal of a resistor R1, the other terminal of which is connected to the output 6.

The output 6 is a current supplying source for the series circuit of the light emitting diode D3 and the resistor R1.

The emitter of a PNP type transistor Q2 is connected to the output 6, and the base thereof is connected through a resistor R6 (adapted to limit the base current) to the cathode (a predetermined connecting point of the series circuit) of the light emitting diode D3. The collector of the transistor Q2 is grounded through a resistor R7 so that, when the transistor Q2 is turned off, an "L" level is produced. Also, the collector of the transistor Q2 provides a power detection signal 7 which is applied to a micro-computer (not shown).

A resistor R2 is to divide the output of the shunt regulator 2, thereby to set the current flowing in the light emitting diode D3 to the most suitable value. A capacitor C4 and a resistor R3 form a phase correcting circuit which prevents the oscillation which is produced by a feedback loop.

A secondary coil L3 is connected to a diode D1 and a capacitor C1, which form a rectifying/smoothing circuit which obtains the negative output 5 for an indicator. On the other hand, another secondary coil L4 is connected to a π type smoothing circuit, which comprises a diode D2, two capacitors C2 and C3, and a choke coil L5. The π type smoothing circuit is to obtain the output 6 (positive 5 V) for the microcomputer.

Now, the operation of the switching power source thus organized will be described, when necessary, with reference to FIG. 2.

Figure 2:
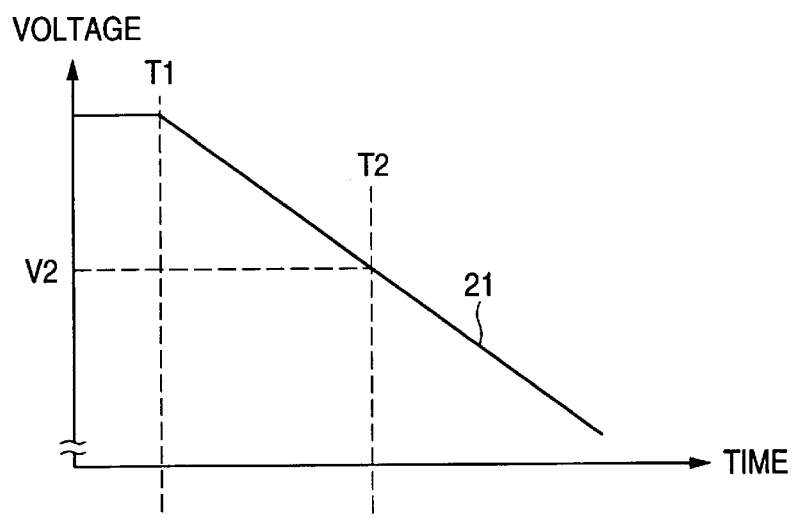
FIG. 2 is a graphical representation indicating changes in voltage of the main line in the switching power source when power outage occurs.
Figure 2:
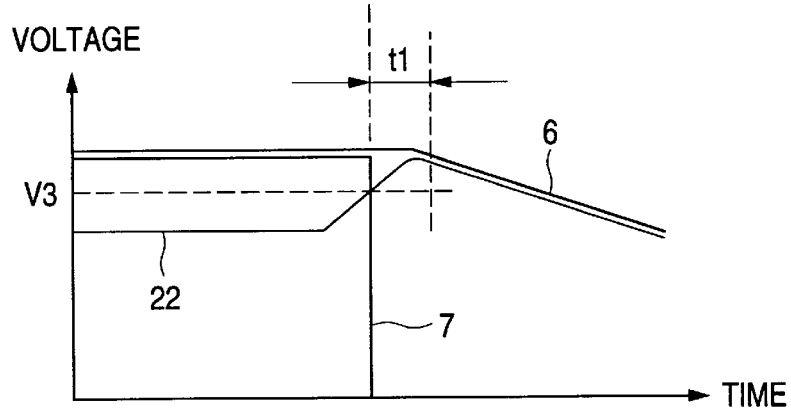

FIG. 2 is an explanatory diagram indicating changes in voltage of a main line when power outage occurs.

In FIG. 2, reference numeral 21 designates the change of an input voltage which is outputted by the rectifying/smoothing circuit 12 and applied to the switching circuit 13. As is seen from FIG. 2, at the time instant T1, power outage occurs, and thereafter the input voltage 21 is gradually decreased. At the time instant T2, the voltage is decreased to a predetermined voltage V2, and further decreased.

The predetermined voltage V2 is set to be the highest voltage with which a margin can be sufficiently obtained in a voltage range lower than the lower limit (determined as the voltage of the commercial power source 9) of the input voltage which is ensured in the operation as the switching power source. Therefore, even when the input voltage 21 reaches the predetermined voltage V2, the voltage of the output 6 is maintained at 5 V.

On the other hand, the error signal outputted by the shunt regulator 2 is a current change signal. However, the output of the shunt regulator 2 is connected to the series circuit of the light emitting diode D3 and the resistor R1. Hence, in a signal 22 indicating the voltage of the output of the shunt regulator 2 (hereinafter referred to as "an error signal 22", when applicable), the voltage is increased when it is specified to increase the voltage of the output 6.

It is now assumed that the present time instant is before the time instant T1. In this case, no power outage occurs, and therefore a predetermined current flows in the light emitting diode D3. Therefore, the voltage drop by the series circuit of the resistor R1 and the light emitting diode D3 is large enough to render the PNP type transistor Q2 conductive. Hence, the power outage detection signal 7 is raised to "H" level, indicating non-power-outage state.

On the other hand, in the case where power outage occurs, and the input voltage 21 is decreasing, in order to correct the decrease of the output 6 due to the decrease of the input voltage 21, the voltage of the error signal 22 is increased (the base-emitter voltage of the PNP type transistor Q2 is decreased). Even if the input voltage 21 is lowered, until it comes near the time instant T2, the output 6 is maintained at 5 V by a slight correction, and therefore the rate of increase of the error signal 22 is small. Hence, the voltage drop by the series circuit is maintained higher than the base-emitter voltage of the PNP type transistor Q2. Therefore, the power outage detection signal 7 is maintained at "H" level.

When it is near the time instant T2, the amount of correction to maintain the output 6 at 5 V is large, and the voltage of the error signal 22 increases greatly. Therefore, at the time instant T2, a limit level V3 set in correspondence to the voltage V2 is reached (the difference voltage between the cathode of the light emitting diode D3 and the output 6 being about 0.7 V which is substantially equal to the base-emitter voltage of the PNP type transistor Q2). As a result, at the time instant T2, the PNP type transistor Q2 is turned off, so that the power outage detection signal 7 is set to "L" level, indicating the occurrence of power outage.

After the time instant T2, the error signal 22 is increased to a voltage which is substantially equal to the voltage of the output 6, and, when the voltage of the output 6 starts to decrease, the voltage of the error signal 22 is decreased as the output 6 decreases.

As was described above, at the time instant T2, the power outage detection signal 7 is set to "L" level indicating the occurrence of power outage. At the time instant T2, the output 6 is maintained at 5 V. Therefore, the period of time t1 in which the normal operation of the microcomputer on the output 6 is ensured, is long enough for the microcomputer to process the power outage.

Figure 3:
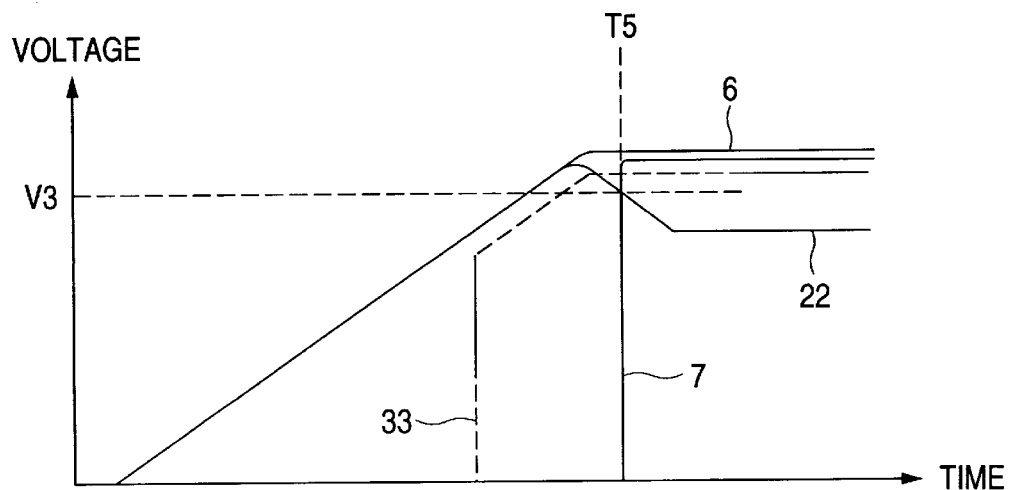
Figure 4:
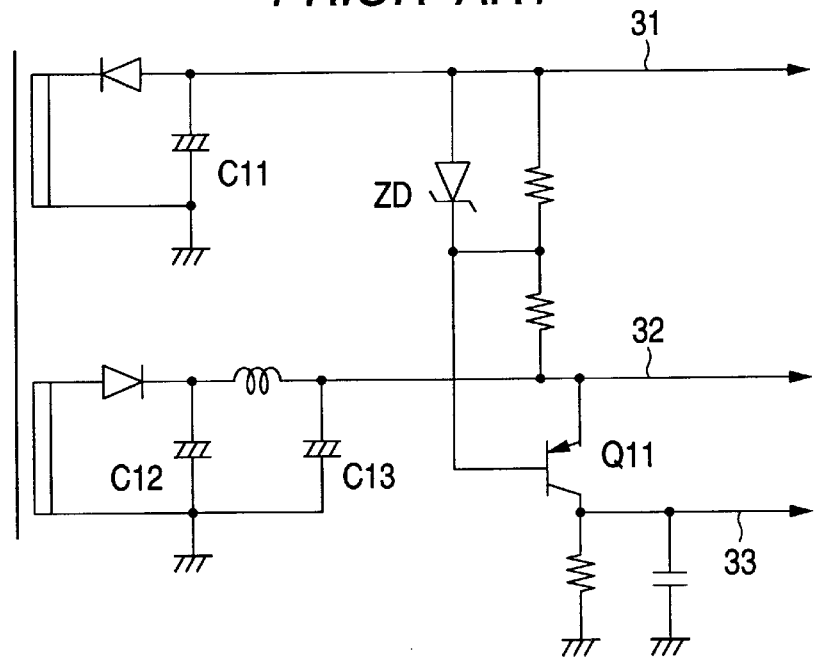
FIG. 4 is a circuit diagram showing the arrangement of a conventional switching power source.
Figure 5:
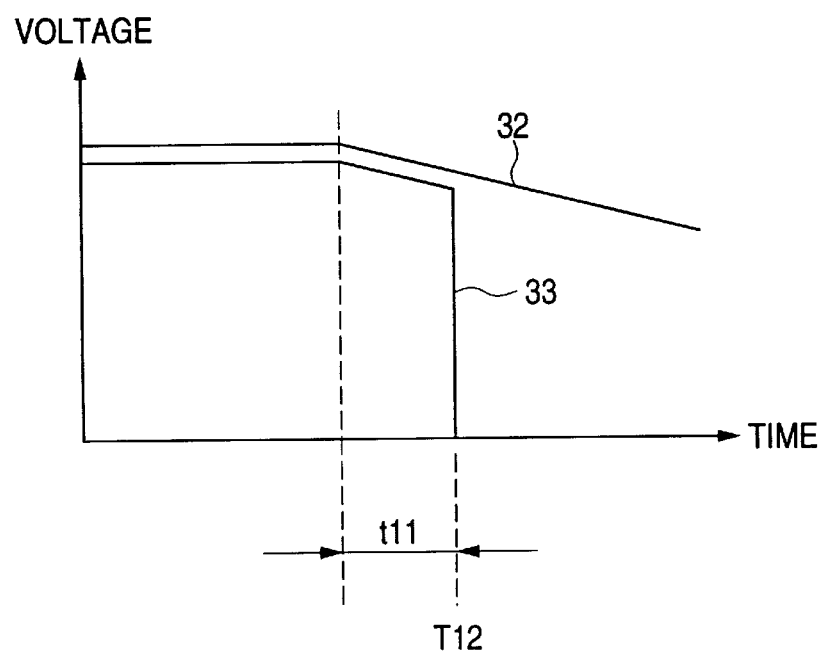
FIG. 5 is a graphical representation indicating changes in voltage of the main line in the conventional switching power source.

FIG. 3 is an explanatory diagram indicating the change in voltage of the main line when the power switch is turned on. In FIG. 3, reference numeral 33 indicates the change of the power outage detection signal in the conventional circuit. The operation of the embodiment with the power switch turned on, will be described with reference to FIG. 3 when necessary.

When the power switch is turned on, the input voltage of the switching circuit 13 is low, and the voltage of the output 6 is lower than 5 V, and therefore the output of the shunt regulator 2 is zero in current. Therefore, the voltage of the error signal 22 (the output of the shunt regulator 2) is substantially equal to the voltage of the output 6. That is, as the voltage of the output 6 increases, the voltage of the error signal 22 is increased. Since the base-emitter voltage of the PNP type transistor Q2 is zero (0), the transistor Q2 is turned off, and the power outage detection signal is at "L" level.

When the input voltage of the switching circuit 13 increases, and the voltage of the output 6 approaches 5 V, the shunt regulator 2 starts to output current to moderate the rate of increase of the voltage of the output 6. Hence, the state of voltage of the error signal 22 is changed from the state that it is increased in correspondence to the increase in voltage of the output 6 to the state that it is decreased. Soon, the voltage of the output 6 reaches the predetermined value 5 V. However, it should be noted that, when the voltage of the output 6 has reached 5 V, the input voltage of the switching circuit 13 is being increased. Hence, in order to prevent the voltage of the output 6 from further increasing, the output current of the shunt regulator 2 increases. As the output current of the shunt regulator 2 increases, the voltage of the error signal 22 decreases greatly.

When the input voltage of the switching circuit 3 is increased to a predetermined voltage (the voltage V2 in FIG. 2)(at the time instant T5), the voltage of the error signal 22 is lowered to the limit level V3. Therefore, at the time instant T5, a base current flows in the PNP type transistor Q2, so that the power outage detection signal 7 is raised to "H" level.

While, after the time instant T5, the input voltage of the switching circuit 13 is increasing, the voltage of the error voltage 22 is decreasing in response to the increase of the input voltage of the switching circuit 13. When the input voltage of the switching circuit 13 becomes maintained constant, the error signal 22 is also stabilized at a predetermined voltage. Further, the power outage detection signal 7 is maintained at "H" level.

If summarized, immediately after the power switch is turned on, the power outage detection signal 7 is at "L" level, and even after the voltage of the output 6 reaches the predetermined value 5 V, it is maintained at "L" level for a while. At the time instant T5, it is raised to "H" level. That is, when the level of the power outage detection signal 7 changes from "L" level to "H" level, the voltage of the output 6 is at the predetermined value 5 V; that is, it is the voltage which ensures the operation of the microcomputer. Hence, when, with the power outage detection signal 7 at "H" level, the microcomputer which is in reset state is released, the microcomputer starts the initial operation normally.

While the invention has been described with reference to its preferred embodiment, it should be noted that the invention is not limited thereto or thereby. In the embodiment, the voltage of the output 6 is 5 V, and therefore the predetermined connecting point of the series circuit is the cathode of the light emitting diode D3. However, for instance in the case where the voltage of the output 6 is 12 V, and the voltage across the resistor R1 meets with the base-emitter voltage of the PNP type transistor Q2, the following modification may be employed: The connecting point of the anode of the light emitting diode D3 and the resistor R1 is the predetermined connecting point, and the connecting point is connected through the resistor R6 to the base of the PNP type transistor Q2.

The switching power source of the invention comprises the power outage detecting section which, under the condition that the level of the error signal provided when the input voltage of the switch circuit adapted to switch the current flowing in the primary coil is lower than the predetermined value is the limit level, outputs the power outage detection signal when the level error signal becomes the limit level.

That is, the error signal is a signal to maintain the output voltage constant when the input voltage of the switching circuit is changed. Therefore, in the case where the input voltage is decreased, the change in level of the error signal occurs before the output voltage is decreased. Hence, also in the case, where the power outage detection is carried out on the secondary side, the timing of the power outage detection can be made earlier.

What is claimed is:

1. A switching power source in which an error signal indicating an error of an output voltage is applied to an isolation element whose input and output are isolated from each other, and an output signal of the isolation element is utilized to control a switching circuit, said switching circuit having an input voltage and switching a current in a primary coil, thereby to stabilize the output voltage, said switching power source comprising:

a power outage detecting section for detecting a limit level of the error signal, wherein when the input voltage of the switching circuit becomes lower than a predetermined voltage, the level of the error signal becomes the limit level and triggers production of a power outage detection signal.

2. The switching power source of claim 1, wherein the isolation element is a photo-coupler having a light emitting diode, the error signal is an output signal of a shunt regulator adapted to detect the error of the output voltage, and an output of the shunt regulator is connected to a series circuit comprising a light emitting diode of the photo-coupler and a resistor connected in series to the light emitting diode, and wherein said power outage detecting section is a PNP type transistor whose emitter is connected to a current supplying source adapted to supply a current to the series circuit, and whose base is connected to a predetermined connecting point of the series circuit, said predetermined connecting point being a connecting point where a voltage is produced which is determined in correspondence to the limit level, and wherein the power outage detection signal is obtained at a collector of the PNP type transistor.

3. The switching power source of claim 1, wherein an output is provided which supplies an operating power source for a microcomputer, and the power outage detection signal is utilized as a reset signal for the microcomputer.

4. A switching power source in which an error signal indicating an error of an output voltage is applied to a photo-coupler whose input and output are isolated from each other, and said error signal is an output signal of a shunt regulator adapted to detect the error of the output voltage, and an output signal of the photo-coupler is utilized to control a switching operation, thereby to stabilize the output voltage, said switching power source comprising:

a power outage detecting section in which, when an input voltage of a switching circuit adapted to switch a current flowing in a primary coil becomes lower than a predetermined voltage, the level of the error signal is a limit level, and when the level of the error signal becomes the limit level, a power outage detection signal is produced, and in which an output of the shunt regulator is connected to a series circuit comprising a light emitting diode of the photo-coupler and a resistor connected in series to the light emitting diode, and wherein said power outage detecting section also comprises a PNP type transistor whose emitter is connected to a current supplying source adapted to supply a current to the series circuit, and whose base is connected to a predetermined connecting point of the series circuit, said predetermined connecting point being a connecting point where a voltage is produced which is determined in correspondence to the limit level, and the power outage detection signal is obtained at a collector of the PNP type transistor.

5. A switching power source comprising:

means for producing an output voltage;

means for generating an error signal which corresponds to an error of said output voltage;

isolation means having an input and an output which are isolated from each other, the error signal being applied to the input of said isolation means, and an output signal being produced by the output of said isolation means;

switching means for stabilizing the output voltage and which switches a current flowing in a primary coil, said switching means having an input voltage and being controlled by the output signal of said isolation means; and power outage detection means for producing a digital power outage detection signal, wherein when the input voltage of said switching operation becomes lower than a selected voltage, the level of the error signal reaches a selected limit and causes the digital power outage detection signal to change logic states.

6. The switching power source of claim 5, wherein the isolation means is a photo-coupler having a light emitting diode;

the means for generating an error signal is a shunt regulator having an input and an output, the output of said shunt regulator being connected to a series circuit comprising the light emitting diode and a resistor connected in series to the light emitting diode, the input of said shunt regulator being controlled by said output voltage; and the power outage detection means comprises a transistor having an input, said input being connected to a selected connecting point on the series circuit, said selected connecting point being a connecting point where a voltage is produced which corresponds to the selected limit level of the error signal, and wherein the digital power outage detection signal is produced by the transistor.

7. The switching power source of claim 6, wherein the transistor is a PNP type transistor having an emitter the is connected to a current supplying source, and having a base that is connected to the selected connecting point on the series circuit, and wherein the power outage detection signal is produced at the collector of the PNP type transistor.

8. The switching power source of claim 5, wherein an output is provided which supplies an operating power source for a microcomputer, and the digital power outage detection signal is utilized as a reset signal for the microcomputer.

9. The switching power source of claim 5, wherein the power outage detection means comprises a transistor having an input controlled by a voltage corresponding to the error signal, and having an output that produces the digital power outage detection signal.

10. A switching power source wherein an error signal indicating an error of an output voltage is applied to a photo-coupler having an input and an output that are isolated from each other, said error signal being an output signal of a shunt regulator adapted to detect the error of the output voltage, and the output of the photo-coupler being utilized to control a switching operation of a switching circuit, said switching circuit having an input voltage and being adapted to switch a current flowing in a primary coil, thereby to stabilize the output voltage, and the output signal of the shunt regulator being connected to a series circuit comprising a light emitting diode of the photo-coupler and a resistor connected in series to the light emitting diode, said switching power source comprising:

a PNP type transistor having a base, a collector, and an emitter, the emitter being connected to a current supplying source adapted to supply a current to the series circuit, the base being connected to a predetermined connecting point of the series circuit, said predetermined connecting point being a connecting point where a voltage is produced which is determined in correspondence to the limit level, and the power outage detection signal being obtained at the collector, wherein when an input voltage of said switching circuit becomes lower than a predetermined voltage, the level of the error signal becomes the limit level, and the power outage detection signal is produced.

11. The switching power source of claim 10, wherein the transistor is a PNP type transistor having an emitter that is connected to a current supplying source, and having a base that is connected to the selected connecting point on the series circuit, and wherein the power outage detection signal is produced at the collector of the PNP type transistor.

12. A switching power source comprising:

means for producing an output voltage;

a photo-coupler having an input and an output which are isolated from each other, the input of said photo-coupler comprising a light emitting diode, the output of said photo-coupler producing an output signal;

a shunt regulator, having an input and an output, the input of said shunt regulator being controlled by said output voltage, and the output of said shunt regulator generating an error signal which corresponds to an error of said output voltage, and which is applied to a series circuit comprising the light emitting diode and a resistor connected in series to the light emitting diode;

switching means having an input voltage and switching a current flowing in a primary coil, said switching means being controlled by the output signal of said photo-coupler; and a transistor having an input that is connected to a selected connecting point on the series circuit, said selected connecting point being a connecting point where a voltage is produced which corresponds to a selected limit level of the error signal, wherein when the input voltage of said switching operation becomes lower than a selected voltage, the level of the error signal reaches a selected limit level and causes the power outage detection signal to be produced by the transistor.

13. A method of detecting power outage of a switching power source, comprising the steps of:

applying an error signal to an isolation element whose input and output are isolated from each other, the error signal indicating an error of an output voltage;

controlling a switching circuit with an output signal from the output of the isolation element, said switching circuit having an input voltage and switching a current in a primary coil, thereby stabilizing the output voltage;

detecting a limit level of the error signal, said limit level being the level of the error signal when the input voltage of the switching circuit becomes lower than a predetermined voltage; and triggering a digital power outage detection signal in response to detecting the limit level of said error signal.

* * * * *